Oct. 13, 1931.  F. C. HACHENEY  1,827,651
HEADLIGHT
Filed Feb. 11, 1929  3 Sheets-Sheet 2
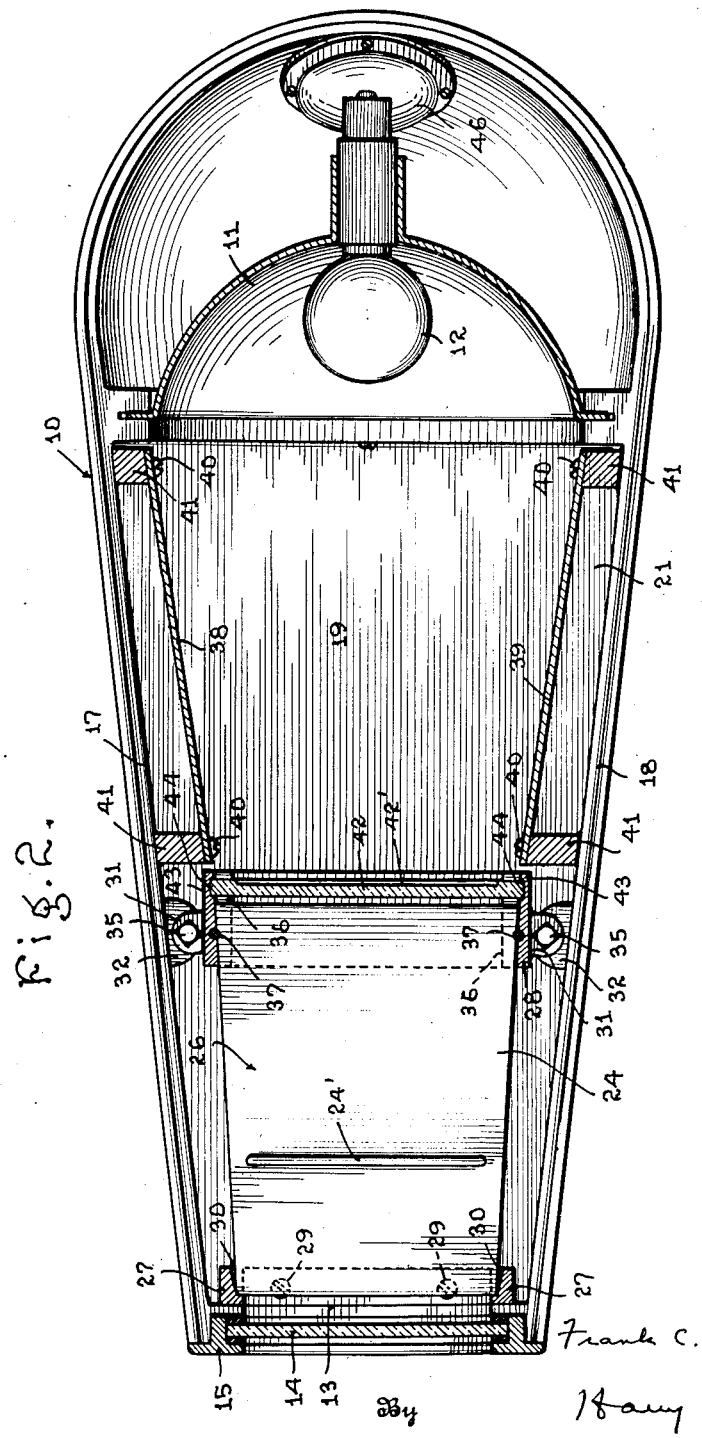
Inventor
Frank C. Hacheney
By Harry Cohen
Attorney Oct. 13, 1931. F. C. HACHENEY 1,827,651
HEADLIGHT
Filed Feb. 11, 1929 3 Sheets-Sheet 3
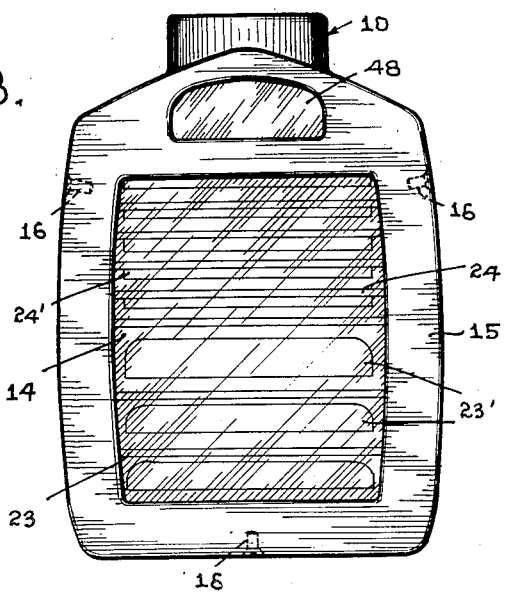
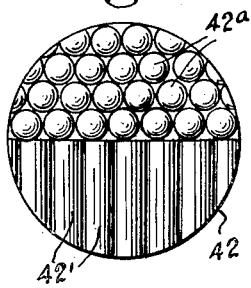
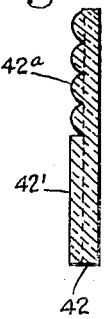
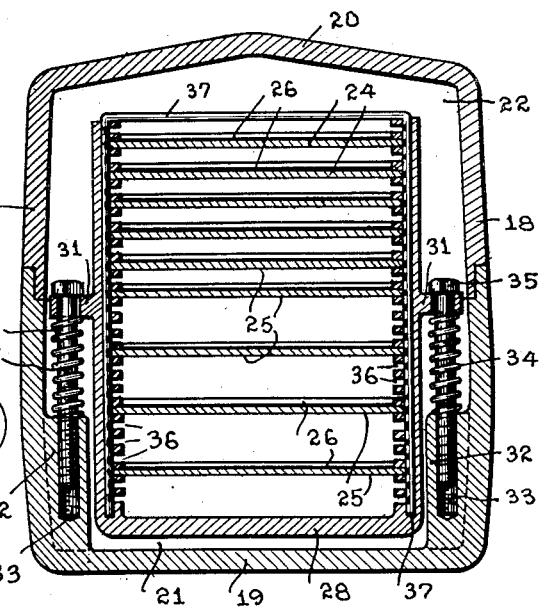
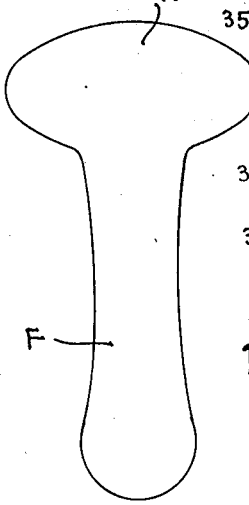
Inventor
Frank C. Hacheney
By Harry Cohen
Attorney Patented Oct. 13, 1931

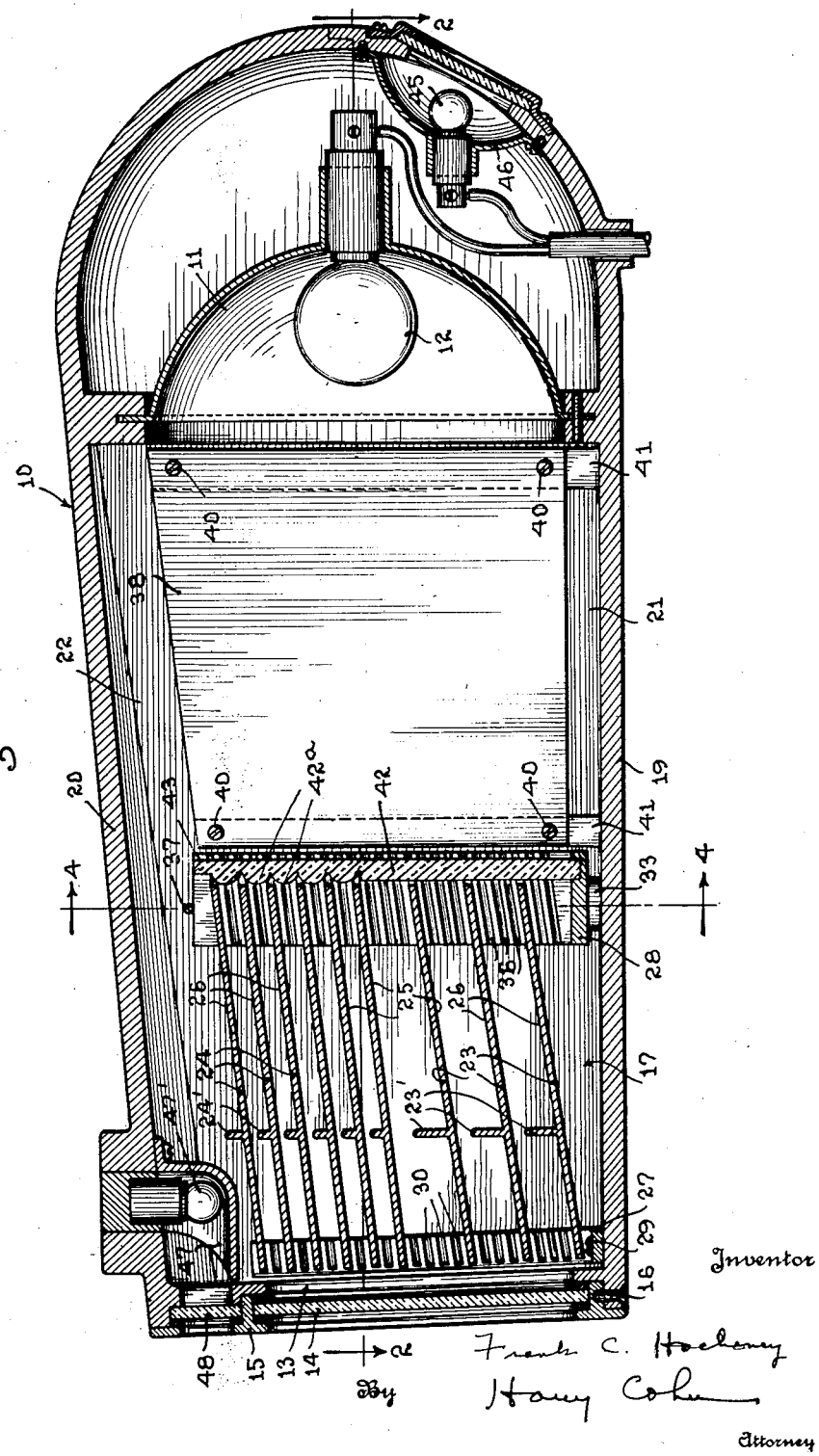

1,827,651

UNITED STATES PATENT OFFICE

FRANK C. HACHENEY, OF VANCOUVER, WASHINGTON

HEADLIGHT

Application filed February 11, 1929. Serial No. 339,077.

My invention relates to light projectors and more particularly to lamps of the headlight type adapted for use on automotive vehicles.

The primary object of the present invention is the provision of a headlight which produces sufficient illumination at all times without glare or blinding and which accomplishes this result without the necessity for any action by the driver.

Another object of the invention is the provision of a headlight to illuminate a comparatively wide zone immediately in front of the vehicle and a comparatively narrow zone extending for a long distance in front of the vehicle, these zones being continuous.

A further object is to provide a headlight, which while affording proper illumination, includes means for hiding the light source from the view of the approaching driver especially when the latter is nearby.

Another object of the invention is generally to improve the construction of headlights.

The objects of the invention are realized in the headlight which will now be described in connection with the accompanying illustrative drawings.

In the drawings:

Fig. 1 is a longitudinal sectional view of the headlight.

Fig. 2 is a sectional view on the line 2—2 of Fig. 1.

Fig. 3 is a front view of the headlight.

Fig. 4 is a sectional view on the line 4—4 of Fig. 1.

Fig. 5 is a view illustrative of the illuminated zones or areas illuminated by the present headlight.

Fig. 6 is a front view of the lens.

Fig. 7 is a vertical sectional view of the lens.

Referring to the drawings in detail, the headlight of the present invention comprises an elongated casing 10 having a parabolic reflector 11 and a lamp 12, and a front opening 13 covered by a glass plate 14 held in place by an apertured metal cover plate 15, secured to the casing in any suitable manner, as by screws 16. The side walls 17 and 18 of the casing converge toward each other from the rear to the front. The bottom wall 19 is substantially horizontal and the top wall 20 is inclined toward the front in converging relation with the bottom wall 19. The casing is split through a horizontal median plane forming lower and upper sections 21 and 22, so that access to the casing may be had by removal of the upper section 22. The front of the casing is inclined downwardly from front to rear whereby light projected from the casing by the devices hereinafter described may be caused to illuminate the roadway as near as possible to the front of the vehicle.

At the front end of the casing there are mounted a series of reflectors comprising a group of lower reflectors 23 and a group of upper reflectors 24. These reflectors consist preferably of flat trapezoidal plates as shown more clearly in Fig. 2. The lower sides 25 of the plates have mirror surfaces and constitute the reflector surfaces. The upper surfaces 26 of the reflector plates are preferably non-reflecting and for this purpose may be painted a suitable color. As shown the reflector plates are inclined toward the front of the casing, the inclination of the lower plates being greater than that of the upper plates. The lower plates reflect light forwardly and downwardly to illuminate a zone or area immediately in front of the vehicle, while the upper plates reflect light to illuminate a more distant zone.

These plates, besides directing the light in this desirable manner to thereby greatly minimize glare, also hide the light source from the view of the operator of an approaching vehicle to thereby further decrease glare. To further enhance this result, the plates are provided with upwardly projecting baffles 23' and 24' integral with or secured to the respective plates in any suitable manner as by being soldered or welded thereto. The height of the baffles may be varied in accordance with the space between adjacent superimposed plates. Accordingly, as here shown, the baffles 23' are of a greater height than the baffles 24' to correspond with the spacing of the plates.

As shown more clearly in Fig. 2, the baffles extend transversely of the reflector plates and terminate short of the side edges of the latter whereby to permit the unrestricted passage of light at these points.

I have found that greatly improved results are obtained by plates of a certain length and by spacing the plates a substantial distance from the light source. For example, I have used plates four inches long and have spaced the rear ends of these plates about four inches from the lamp and the parabolic reflector with very good results. It will be understood, however, that the length of the plates and their distance from the light source may be varied within certain limits.

The plates are mounted in a frame which has provision for variable spacing of the plates and for adjusting the inclination thereof. The frame comprises a front support 27 and a rear support 28. The front support 27 is rigidly secured to the casing 10 in any convenient manner as by the screws 29. This support has a plurality of downwardly inclined slots 30 in which the forward ends of the reflector plates are mounted, the slots being slightly larger than the corresponding portions of the plates whereby to permit the latter to be tilted therein.

The rear support 28 is mounted for adjustment vertically of the headlight casing whereby the rear ends of the plates may be raised or lowered. For this purpose the rear support is provided at the sides thereof with apertured lugs 31, and the casing 10 is provided with inwardly projecting bosses 32 having screw threaded recesses 33 in alignment with the apertured lugs 31. The support 28 is mounted on helical springs 34, which tend to move the support upwardly in the casing. Bolts 35 pass through the apertured lugs 31 and through the springs 34 and are received adjustably within the screw threaded apertures of the bosses 32. It is apparent that the rear ends of the plates may be raised or lowered by adjusting the bolts 35. The sides of the support 28 have a plurality of inclined slots 36 in correspondence with the slots 30 of the front support 27. The reflector plates 23 and 24 may be removed from the frame comprising the front and rear members 27 and 28 by sliding them rearwardly of the rear support. A U-shaped spring member 37 is mounted in the rear support and holds the reflector plates in position by engaging the side edges thereof.

Side reflectors 38 and 39, preferably in the form of flat plates having mirror surfaces, extend longitudinally of the casing between the parabolic reflector and the rear support 28. These reflector plates are secured to the casing in any suitable manner as by screws 40 which fasten the plates to lugs 41 which project inwardly from the side walls of the casing. The plates 38 and 39 converge toward each other from the rear of the casing, toward the front, as shown more clearly in Fig. 2.

A lens 42 is mounted adjacent the rear ends of the reflector plates 23 and 24. For this purpose the frame member 28 has a rearwardly projecting portion 43, the sides of which are slotted as indicated at 44 to receive the lens 42. Approximately the lower half of the lens 42, or that portion through which the light passes to the reflector plates 23, is provided with a series of vertically extending refractory ribs or prisms 42' for spreading and diffusing laterally the light which passes through this portion of the lens, and the upper portions of the lens, or that portion through which the light passes to the reflector plates 24, is provided with a series of light converging elements 42a, for the purpose of narrowing the beam of light which passes through this portion of the lens. The reflector plates and the lens thus cooperate to illuminate a comparatively wide zone immediately in front of the vehicle and a comparatively long and narrow zone extending for a long distance in front of the vehicle, for the lower portion of the lens spreads the light which passes to the lower reflector plates 23, which are at such an angle as to direct the light immediately in front of the vehicle, and the upper portion of the lens serves to converge the light which is reflected by the plates 24 at such an angle as to illuminate a zone for a long distance in advance of the vehicle, the latter zone being continuous with the first mentioned zone whereby there are no dark spots within the illuminated areas.

I have found it highly desirable to employ a colored lens preferably an orange shade, the color being darker in the lower portion of the lens and gradually lighter toward and in the upper portion. A lens thus constructed and colored cooperates with the other devices to project a mellow light. The continuous illumination between the wide and narrow zones as described may be effected by the proper adjustment of the inclination of the reflector plates.

At the rear of the casing 10 a lamp 45 and a reflector 46 are mounted for directing light toward the side and rear of the vehicle to illuminate the side of the vehicle and the adjacent roadway. At the upper front portion of the headlight casing there is mounted a parking lamp 47' and a reflector 47, visible through a glass covered opening 48 in the top portion of the closure plate 15. These auxiliary lights, while not necessary to the main purposes of the invention, are desirable because they contribute to the utility of the headlight.

The type of illumination obtained by the headlight embodying the principles of the present invention is illustrated in Fig. 5. The reference character N designates the comparatively wide area or zone of illuminated roadway immediately in front of the vehicle, and the reference character F designates the comparatively long and narrow zone of illuminated roadway in advance of the zone N continuous with the latter.

In practice the zones may overlap slightly but overlapping can be obviated by proper adjustment of the reflector plates in the manner previously described. The near zone is illuminated by the proper direction of the light by the lower group of reflectors in conjunction with the lower portion of the lens. The distant zone is illuminated by the light directed by the upper group of reflectors, the upper portion of the lens and the side reflectors cooperating to project and narrow the beam of light.

While I have disclosed my invention in an embodiment which I prefer, it will be understood that certain changes in the construction or arrangement of parts will occur to those skilled in the art and may be made without departing from the invention and that the invention is not to be considered as limited to the illustrated embodiment.

I claim:

1. A headlight comprising a casing having an opening at the front, a source of light and a reflector in said casing at the rear, a lens in said front opening for converging some of the light from said light source and for laterally spreading some of the light from said light source, said lens comprising an upper portion for converging the light and a lower portion having a plurality of prisms for spreading the light, a series of reflector plates for directing light from said light converging portion of said lens to a far zone and a plurality of reflector plates for directing light from said lower portion of the lens for illuminating a near zone, whereby to obtain a comparatively wide zone of illumination immediately in front of the vehicle and a comparatively narrower zone of illumination ahead.

2. A headlight comprising a casing having an opening at the front, a source of light and a reflector in said casing at the rear, a lens in said front opening for converging some of the light from said light source and for laterally spreading some of the light from said light source, said lens comprising an upper portion having means for converging the light and a lower portion having a plurality of prisms for spreading the light, and reflector plates for directing said light downwardly.

3. A headlight comprising a casing having an opening at the front, a source of light and a reflector in said casing at the rear, a lens in said front opening for converging some of the light from said light source and for laterally spreading some of the light from said light source, said lens comprising an upper portion having means for converging the light and a lower portion having a plurality of prisms for spreading the lights, a series of reflector plates for directing light from said light converging portion of said lens to a far zone and a plurality of reflector plates for directing light from said lower portion of the lens for illuminating a near zone, said plates being inclined toward the front of said casing, said plates associated with said lower portion of the lens being more inclined than the other plates whereby to direct the light passing through this portion of the lens to the near zone immediately in front of the vehicle.

In testimony whereof I hereunto affix my signature.

FRANK C. HACHENEY.